(12) United States Patent
Strazzari et al.

(10) Patent No.: US 10,955,073 B2
(45) Date of Patent: Mar. 23, 2021

(54) TUBE FOR CONVEYING FLUIDS

(71) Applicant: FITT S.P.A., Sandrigo (IT)

(72) Inventors: Luca Strazzari, Marostica (IT);
Ottorino Barbiero, Bressanvido (IT);
Michele Pornaro, Thiene (IT)

(73) Assignee: FITT S.P.A., Sandrigo (IT)

( * ) Notice: Subject to any disclaimer, the term of this patent is extended or adjusted under 35 U.S.C. 154(b) by 125 days.

(21) Appl. No.: 16/333,367

(22) PCT Filed: Sep. 28, 2017

(86) PCT No.: PCT/IB2017/055962
§ 371 (c)(1),
(2) Date: Mar. 14, 2019

(87) PCT Pub. No.: WO2018/060919
PCT Pub. Date: Apr. 5, 2018

(65) Prior Publication Data
US 2019/0211950 A1     Jul. 11, 2019

(30) Foreign Application Priority Data

Sep. 29, 2016   (IT) .......................... 102016000097951

(51) Int. Cl.
*F16L 11/08*     (2006.01)
*F16L 9/128*     (2006.01)

(52) U.S. Cl.
CPC ............... *F16L 11/08* (2013.01); *F16L 9/128* (2013.01); *F16L 11/081* (2013.01)

(58) Field of Classification Search
CPC ..... F16L 9/12; F16L 9/128; F16L 9/16; F16L 11/08; F16L 11/081; F16L 11/11; F16L 11/112

USPC .......................... 138/121, 122, 126, 132, 173
See application file for complete search history.

(56) References Cited

U.S. PATENT DOCUMENTS

| 3,047,026 | A | * | 7/1962 | Kahn | ..................... F16L 11/112 138/122 |
| 4,140,154 | A | * | 2/1979 | Kanao | ..................... F16L 11/10 138/122 |
| 4,628,966 | A | * | 12/1986 | Kanao | ................... B29C 53/785 138/122 |
| 5,046,531 | A | * | 9/1991 | Kanao | ..................... F16L 11/24 138/122 |
| 5,390,704 | A | * | 2/1995 | Kanao | ................... F16L 11/112 138/121 |
| 6,701,968 | B2 | * | 3/2004 | Bolonhezi | ............. F16L 11/081 138/122 |

(Continued)

FOREIGN PATENT DOCUMENTS

| CH | 681911 | 6/1993 |
| DE | 20200900339 | 5/2009 |

(Continued)

OTHER PUBLICATIONS

International Search Report for PCT Application No. PCT/IB2017/055962 dated Jan. 4, 2018 (2 pages).

*Primary Examiner* — Patrick F Brinson
(74) *Attorney, Agent, or Firm* — Tutunjian & Bitetto, P.C.

(57) ABSTRACT

The present invention regards a hose for transporting fluids including a main body and at least one spiral or helical component embedded or formed within the main body.

13 Claims, 5 Drawing Sheets

(56) References Cited

U.S. PATENT DOCUMENTS

| | | | | |
|---|---|---|---|---|
| 7,870,876 B2* | 1/2011 | Kanao | ............... | F16L 11/10 |
| | | | | 138/129 |
| 8,752,591 B2* | 6/2014 | Montalvo | ............... | F16L 11/112 |
| | | | | 138/122 |
| 10,132,446 B2* | 11/2018 | Joh | ............... | B63B 25/16 |
| 2010/0071795 A1* | 3/2010 | Montalvo | ............... | F16L 11/085 |
| | | | | 138/126 |

FOREIGN PATENT DOCUMENTS

| | | |
|---|---|---|
| EP | 1118809 | 7/2001 |
| EP | 1117958 | 3/2006 |
| EP | 2209850 | 1/2012 |
| FR | 2978812 | 2/2013 |

\* cited by examiner though the present tube is illustrated as intended for passage/conveyance of water, the present invention is not limited to this type of fluid.

TUBE FOR CONVEYING FLUIDS

TECHNICAL FIELD OF THE INVENTION

The present invention regards a hose for transporting fluids, if desired hoses for swimming pools, which during use are underground or under the floor.

STATE OF THE PRIOR ART

Up to now, many hoses for transporting fluids, in delivery or suction, have been proposed. Such hoses usually comprise a main tubular body in which a reinforcement spiral can be embedded, which has greater rigidity than the main tubular body.

Hoses of this type are described, for example, in patents EP1117958B1, EP2209850B2 and PR2978812a1, all in the name of the applicant of the present patent application.

In fields different from that of swimming pools, even other hoses have been proposed, such as those taught by documents CH681911A5 and EP1118809A2, which have reinforcement spiral with geometric shapes complex and unsuitable to implement the mechanical features of a respective hose.

A similar reasoning applies to DE202009003394, which relates to a hose for systems for ventilating and climatizing buildings and that is not suitable for being used in swimming pools or anyway in underground condition.

SUMMARY OF THE INVENTION

The main object of the present invention is to provide a new hose for transporting fluids, (if desired) in particular for transporting water, in particular in swimming pools.

Another object of the present invention is to provide a hose as stated above which has high strength, greater than that of conventional hoses.

Another object of the present invention is to provide a hose with high annular rigidity and crushing resistance properties, simultaneously having flexibility comparable to that of conventional hoses.

In accordance with one aspect of the invention, a hose according to the present application is provided.

The present application refers to preferred and advantageous embodiments of the invention.

BRIEF DESCRIPTION OF THE DRAWINGS

Other characteristics and advantages of the invention will be clearer from the description of embodiments of a hose, illustrated by way of example in the set of drawings in which.

In the set of drawings, equivalent parts or components are marked with the same reference numbers.

DETAILED DESCRIPTION OF THE INVENTION

Figure 1:
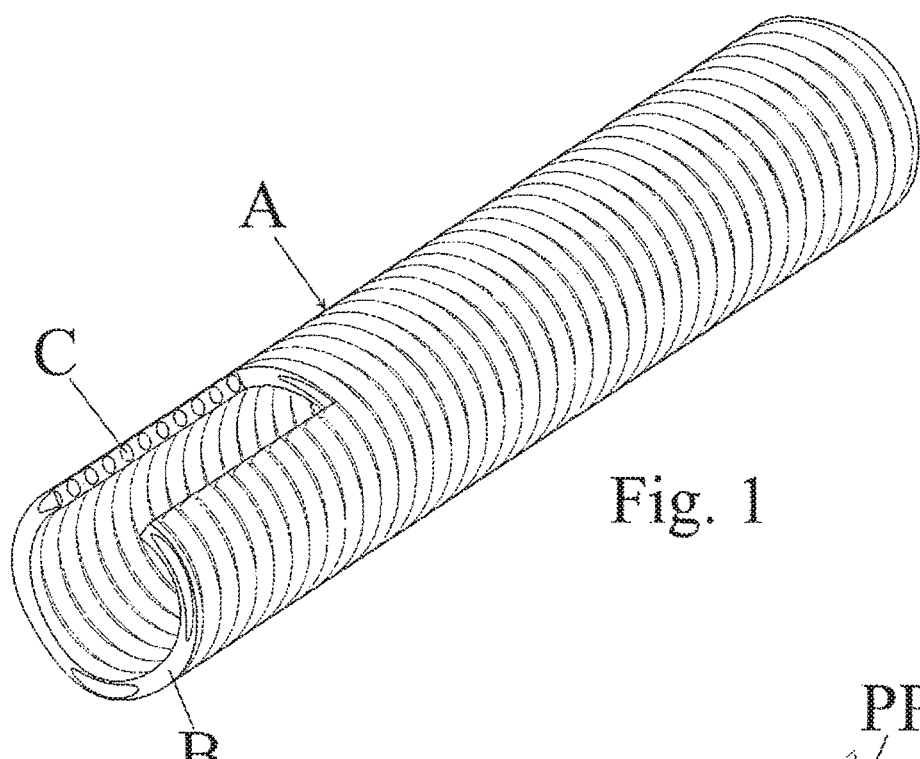
FIG. 1 is a slightly top perspective view with transparent main body of a hose according to the state of the art.
Figure 2:
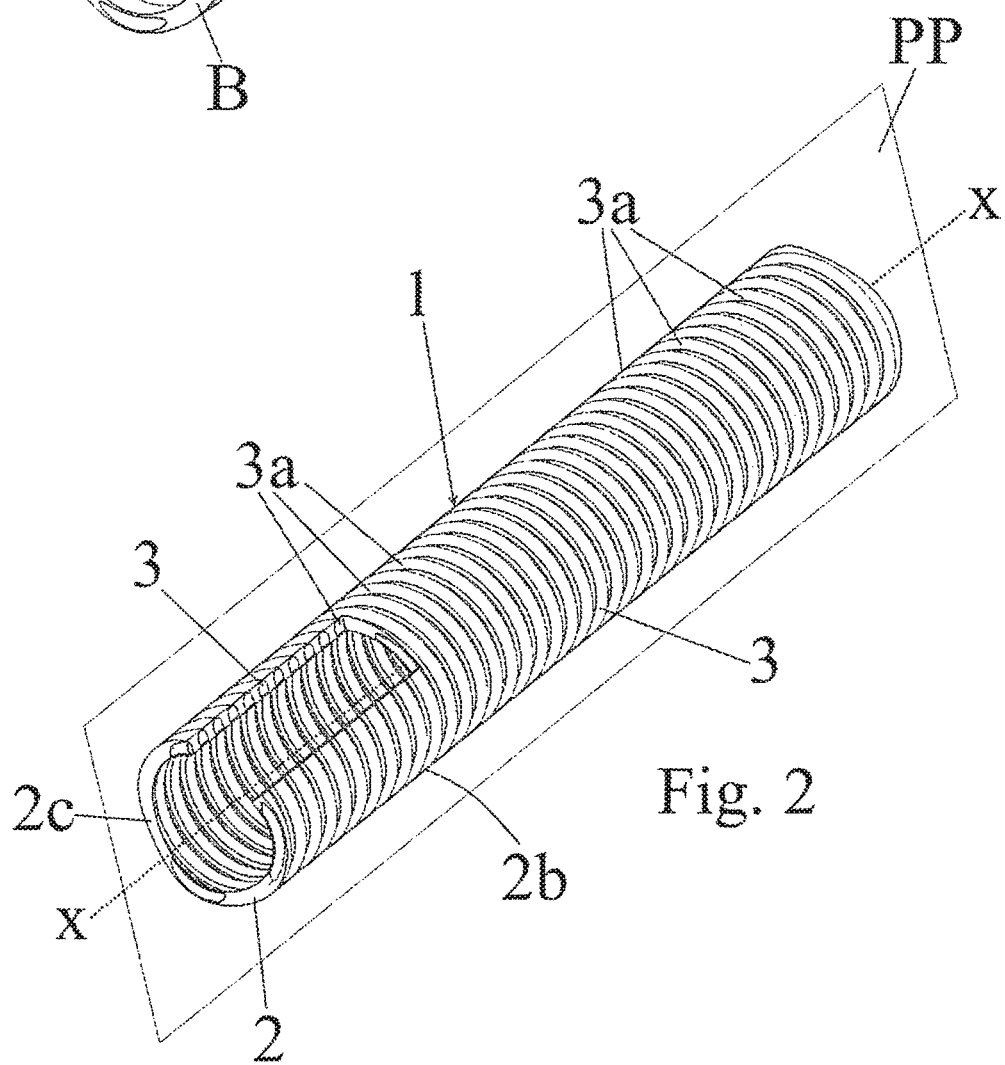
FIG. 2 is a slightly top perspective view with transparent main body of a hose according to the present invention.
Figure 3:
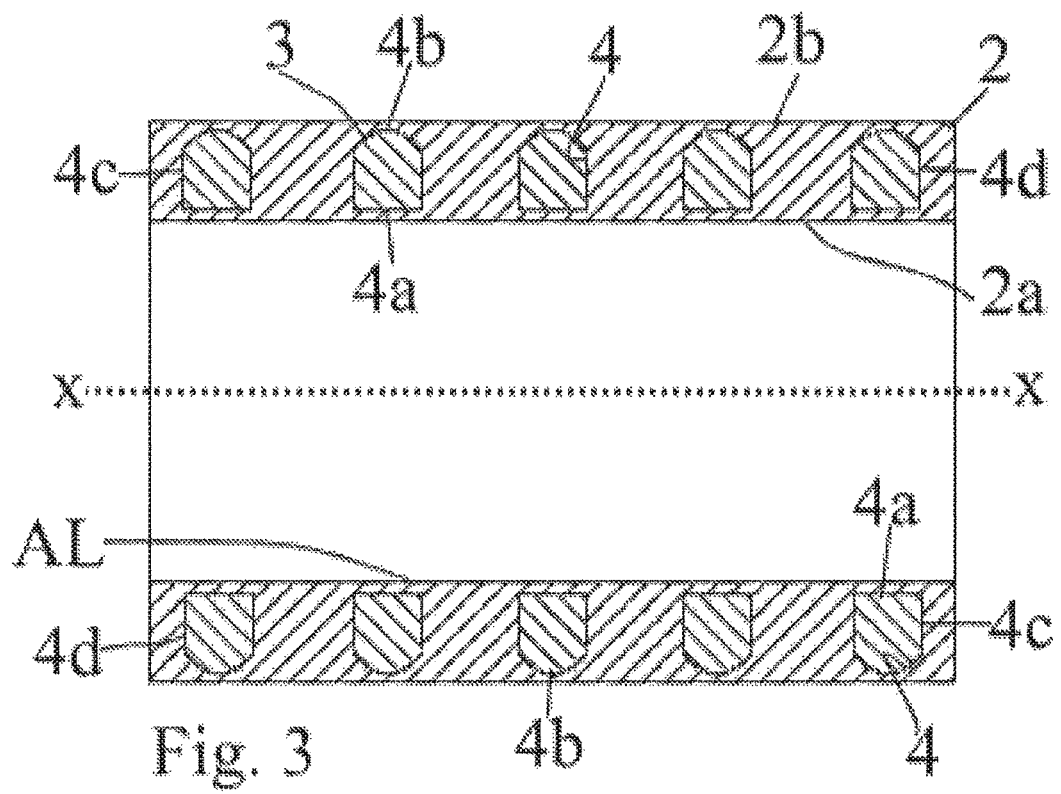
FIG. 3 is a cross section view of a part of the hose of FIG. 2.
Figure 4:
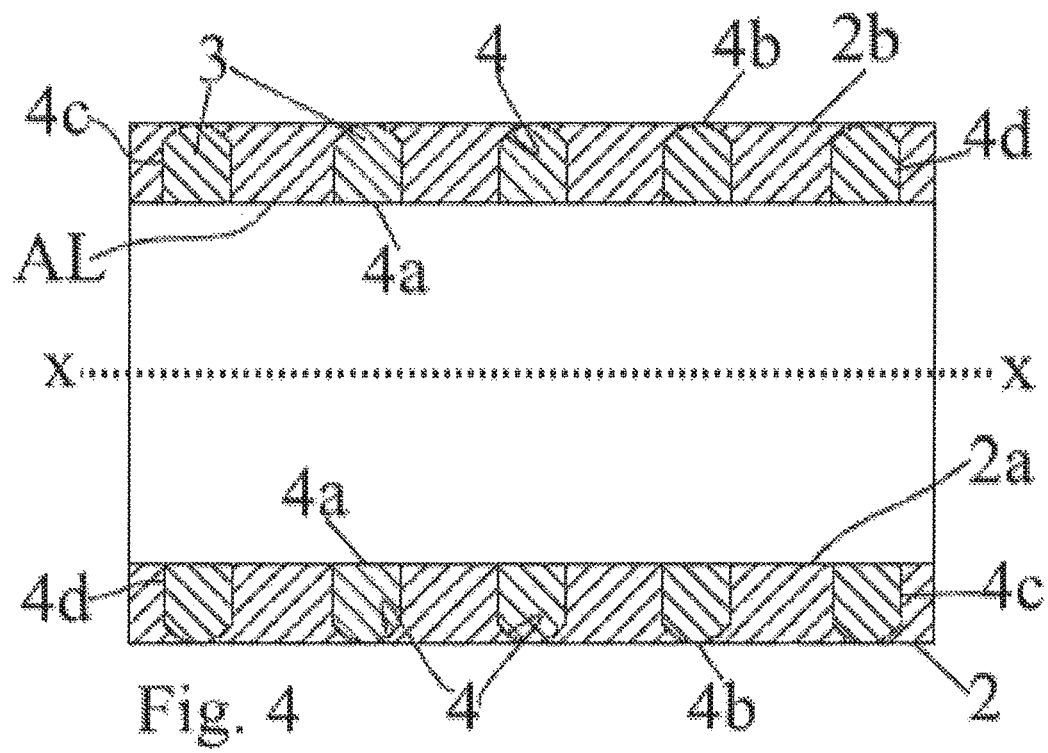
FIG. 4 is a view similar to FIG. 3 relative to another embodiment of a hose in accordance with the present invention.
Figure 5:
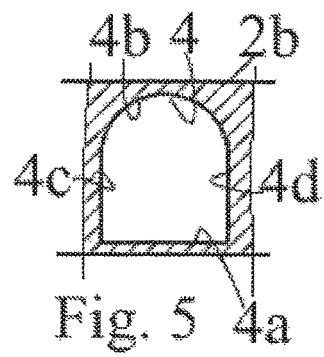
FIGS. 5 to 12 illustrate details of respective embodiments of hoses according to the present invention, in which, for illustration purposes, the spiral component was not illustrated through the section symbol.
Figure 6:
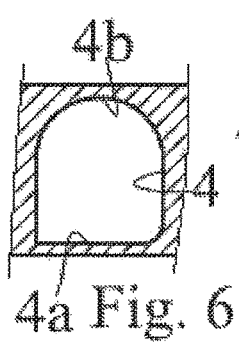
Figure 7:
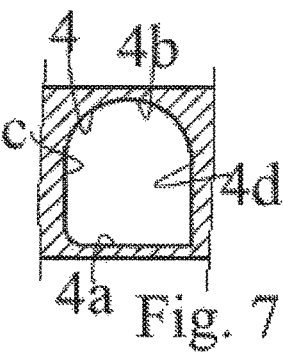
Figure 8:
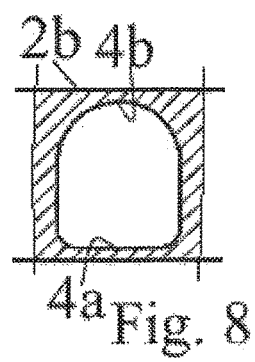

In FIG. 1, a hose A according to the state of the art is illustrated which has a tubular main body B as well as a spiral C embedded within the tubular main body B, and such spiral C has a circular cross section.

With reference now to FIGS. 2 to 8, a hose 1 for transporting fluids according to the present invention is illustrated. Such hose can for example transport water, if desired for swimming pools, and is designed to be or placed in the ground or under the floor, which hose comprises a main body or support body 2 having an inner tubular surface 2a delimiting an axial opening AL for the passage of a fluid inside the hose 1 and an outer tubular surface 2b, and such main body defines a first 2c and a second (not visible in the figures) mouth or annular end for introducing/dispensing fluid into/from the axial opening AL. The main body 2 has a longitudinal symmetry axis x-x. Preferably, the hose has cross section or section orthogonal to axis x-x that is circular.

The main body 2 is fluid-sealed, for example obtained by means of an element selected from the group constituted by thermoplastic materials such as PVC containing plasticizers (plasticized PVC or PVC P), thermoplastic elastomers (TPE) of any type such as TPE-U, TPE-O, TPE-V, TPE-S, TPE-E.

Preferably, the main body 2 is integrally made or made of a single piece. In addition, the hose 1 could have outer or inner coating layers for the main body, for example as described in the abovementioned European patents.

The hose 1 also comprises at least one spiral or helical reinforcement component 3, which is embedded or formed within the (and if desired simultaneously with the) main body 2 and unwinding or extending around the longitudinal symmetry axis x-x, preferably from the first 2c to the second mouth or annular end, and such spiral or helical component 3 has cross section 4, with a first perimeter section 4a proximal to the inner tubular surface 2a and distal from the outer tubular surface 2a and at least one second perimeter section 4b distal from the inner tubular surface 2a and proximal to the outer tubular surface 2b and defining, with the first perimeter section 4a, and if desired also with other sections that will be discussed hereinbelow, the outer perimeter or delimitation perimeter of the cross section 4.

The spiral or helical component 3 can project with respect to the inner tubular surface 2a and/or to the outer tubular surface 2b of the main body 2, though, preferably, the same does not project with respect to such surfaces and is entirely embedded in the tubular body 2.

If desired, the first 4a and/or the second 4b perimeter section are flush with or graze, respectively, the inner tubular surface 2a and/or the outer tubular surface 2b, i.e. there are no portions of the main body between the first perimeter section 4a and the inner tubular surface 2a and/or there are no portions of the main body between the second perimeter section 4b and the outer tubular surface 2b.

The cross section 4 is taken along a plane PP in which the longitudinal symmetry axis x-x lies, i.e. a plane of the set or sheaf of planes having the longitudinal symmetry axis x-x as straight line in common.

The spiral or helical component 3 can be made of a material selected from the group constituted by polyvinyl chloride (PVC), polyethylene (PE), polypropylene (PP), polyoxymethylene (POM), acrylonitrile-butadiene-styrene (ABS), styrene acrylonitrile (SAN), polybutylene terephthalate (PBT), polyethylene terephthalate (PET), polyphenylene oxide (PPO), polyphenylene ether (PPE), polyamide PA6, polyamide PA66, polycarbonate (PC), polycarbonate/acrylonitrile-butadiene-styrene (PC/ABS) or from mixtures thereof.

The spiral or helical component 3 has greater rigidity than the main body 2.

Advantageously, the spiral or helical component 3 comprises, for its entire extension thereof, a plurality of substantially circular turns or sections 3a that are successive and adjacent. The spiral or helical component 3 is integrally made or made of a single piece, e.g. obtained via extrusion, and is advantageously extended over the entire extension of the hose 1, i.e. from the first 2c to the second mouth or annular end so as to reinforce the main body 2 for the entire extension thereof, though alternatively the spiral or helical component could cover only one section of the hose, e.g. not extending at the ends of the hose, or multiple spiral or helical components could be provided that are placed in succession one after the other along the longitudinal symmetry axis x-x.

If desired, the longitudinal symmetry axis x-x constitutes a longitudinal symmetry axis of the spiral or helical component 3, i.e. the axis of the turns 3a thereof.

In addition, the first perimeter section 4a is substantially straight (although it could also not be straight) and parallel to the inner tubular surface 2a (see FIG. 3), or it substantially coincides (see FIG. 4) with the inner tubular surface 2a or with a respective section thereof, and in such case the first perimeter section 4a could delimit, together with the main body, the axial opening AL.

Alternatively, the first perimeter section 4a can be slightly curved with radius of curvature greater than the second perimeter section 4b.

In substance, the first perimeter section 4a is preferably substantially parallel to the longitudinal symmetry axis x-x.

Preferably, the second perimeter section 4b comprises a curved section with concavity directed towards the inner tubular surface 2a or it has multiple tilted segments or sections together defining an acute angle directed towards the inner tubular surface 2a.

If desired, the second perimeter section 4b at least partly coincides, in particular at an end or tip section thereof, with the outer tubular surface 2b or it projects therefrom.

In the present patent application, by radius of curvature it is to be intended the radius of the circumference, termed osculating circle, that best approximates the curve at a specific point, i.e. that the radius of curvature of the second perimeter section 4b is the radius of the circumference in which the second perimeter section 4b substantially lies.

If desired, the cross section has a third 4c and a fourth 4d section placed on opposite sides from each other and each set to connect, as a bridge, one end of the first section 4a with one end of the second section 4b. The third 4c and the fourth 4d section are substantially parallel and transverse or orthogonal to the longitudinal symmetry axis x-x.

Hence, one (see FIGS. 6 and 7) or both (see FIG. 8) of the edges between the first section 4a and the third 4c or fourth 4d section can be radiated, rounded or not.

In substance, a hose according to the present invention in accordance with FIGS. 2 to 8 comprises a spiral or helical component 3 with a substantially capital D-shaped cross section 4 with first perimeter section 4a corresponding to the substantially straight base side of the D and second perimeter section 4b corresponding to the curved or domed part of the D projecting from the substantially straight side. The third 4c and the fourth 4d section, if provided, in such case correspond to the connection parts between substantially straight base side and curved or domed part.

Figure 9:
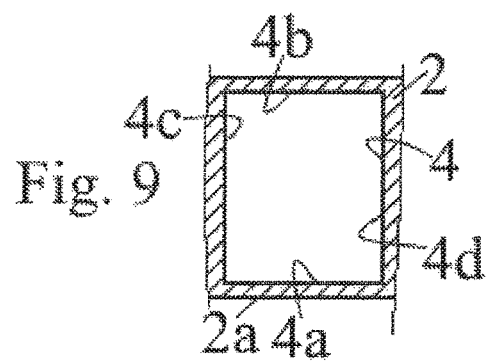
Figure 10:
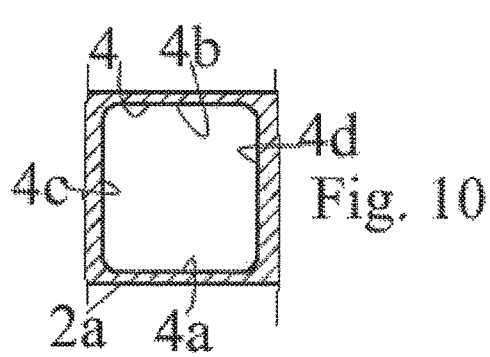

Alternatively, a hose according to the present invention can have spiral or helical component with section 4 configured as a rectangle (see FIGS. 9 and 10), in which case the first perimeter section 4a constitutes a side of the polygonal section.

The section 4 of a spiral or helical component 3 in accordance with the present invention is therefore neither circular nor elliptical.

Figure 11:
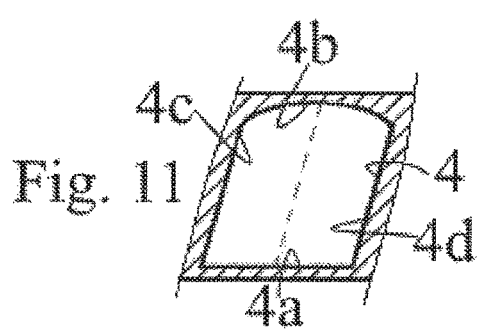
Figure 12:
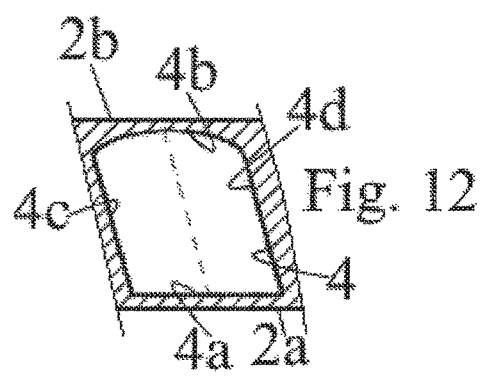

If desired, additionally, the third 4c and the fourth 4d section can be tilted (see FIGS. 11 and 12), e.g. by an angle between 10° and 40° with respect to the longitudinal symmetry axis x-x; in this case, such sections are not orthogonal with respect to the latter axis.

The third 4c and fourth 4d section are substantially straight.

Advantageously, the cross section 4 of the reinforcement spiral or helical component 3 decreases continuously (i.e. there are no intermediate sections where the section increases and then it decreases again) and/or is constant in the passage from the first section 4a to the second section 4b.

In this regard, the distance between the ends of the sections 4c and 4d proximal or bridge connected from the first section 4a is equal to or greater than the distance between the ends of the sections 4c and 4d proximal or bridge connected by the second perimeter section 4b.

In a hose according to the present invention, defining height H of the section 4 as the dimension of the latter in the direction from the outer tubular surface 2b to the inner tubular surface 2a and width L of the section as the dimension of the latter in the direction orthogonal to the height H, i.e. substantially in the direction from an annular end of fluid introduction to an annular end of fluid dispensing of the hose, whereas the section 4 has a width L less than, equal to or up to 1.5 times the height H.

If desired, the height H varies between 1 mm and 25 mm, e g between 1 mm and 15 mm, while the width L varies between 1 mm and 25 mm, for example between 1 mm and 15 mm. The first perimeter section 4a preferably defines and extends for a value corresponding to the width L of the respective section 4.

With regard instead to the first perimeter section 4a, if the same has only one radius of curvature, this can have radius of curvature between 1.3 L and +∞, hence substantially a straight line.

If the second perimeter section 4b has only one radius of curvature, then the same radius can be comprised between ½ L and 6 times L.

Clearly, the first and/or the second perimeter section could have multiple radii of curvature, e.g. with an intermediate section with a first radius of curvature and two lateral connection sections with radius of curvature less than the first radius of curvature.

The height H of the cross section 4 is preferably defined by the second section, if desired also with third 4c and fourth 4d section.

With regard to the thickness of the main body, this is equal to or slightly greater than the height H of the section 4.

Nevertheless, if the main body 2 does not have constant thickness and it has limited thickness at intermediate sections between one turn and the next of the spiral or helical component 3, then the thickness of such intermediate sections would be less than the height H. In such case, the thickness of the main body 2 would be equal to or slightly greater than the height H of the section 4 only at the respective sections of delimitation of the housing zone of the turns of the spiral or helical component 3.

Preferably, the section 4 of the spiral or helical component 3 is substantially equal for the entire unwinding thereof, even if the same could also undergo variations from one end of the spiral or helical component 3 to the other. For the obtainment of a hose according to the present invention, one of the methods proposed up to now for making hoses with spiral or helical components can be used.

One such method could first provide for heating a first material, e.g. plastic, and a second material, e.g. plastic, until they are brought into a pasty state, then co-extruding the materials at the pasty state towards an outlet so as to form a strip of suitable section comprising a support layer or main body made of the first material, in which the reinforcement component made of the second material is embedded. Subsequently, the strip is placed on a rotary mandrel along a spiral or helical path, with turns in contact alongside each other so as to define the substantially tubular and reinforced wall of the hose.

Clearly, the hose can also have other layers, which can be obtained via co-extrusion or with pre extrusion or post extrusion with respect to the main body. Such layers can be obtained starting from an element similar to or identical to that constituting the main body 2 and can also be formed outside or inside the main body 2, e.g. to coat the spiral or helical component 3.

See for such purpose the European patent EP1117958B1, in particular the description of the state of the art.

Figure 13:
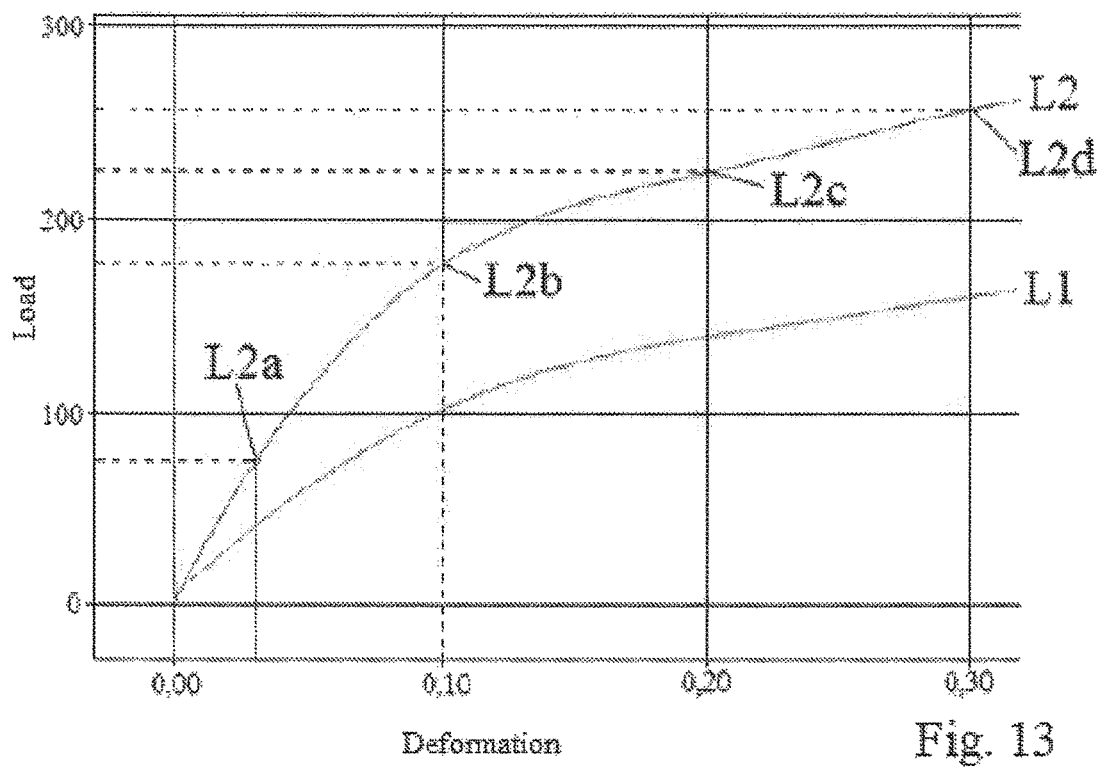
FIG. 13 is a diagram which illustrates the comparison of the deformation as a function of the applied force between a hose in accordance with the state of the art and a hose according to the present invention.

In FIG. 13, a diagram is illustrated in which the deformation as a function of the force in N of a hose in accordance with the state of the art and of a hose according to the present invention is compared.

More particularly, a hose according to the state of the prior art was taken with spiral or helical component 3 having circular section with radius equal to about 1.6-1.7 mm, hence height and width equal to about 3.2-3.4 mm, and a hose in accordance with the present invention with spiral or helical component having circular section with height equal to about 3.80 mm and width equal to about 2.50 mm Both the hoses had a length of about 30 cm.

Such hoses were subjected to deformation, obtaining the diagram of FIG. 17 by applying the method established by the ISO 9969 standard "Thermoplastics pipes—Determination of ring stiffness".

Two curves are illustrated in the diagram, a first curve L1 relative to the test results of a hose according to the state of the art and a second curve L2 relative to the test results of a hose according to the present invention.

Also underlined, by means of suitable straight lines, are the points L2a, L2b, L2c and L2d of the curve L2 corresponding to the application of a force or load in order to respectively obtain 3%, 10%, 20% and 30% of deformation of the internal diameter of the hose.

It has been observed that the tested hose according to the state of the art underwent a deformation of 3%, when subjected to a load equal to about 420 N, while a hose according to the present invention underwent a deformation of 3% when subjected to a load of 754 N.

A hose according to the present invention therefore has, due to the section of the respective spiral or helical component, high annular rigidity and crushing resistance.

This characteristic is particularly important for hoses for underground applications, in order to prevent deformations determined by the weight of the overlying ground and consequent possible breakage.

It has also been seen that a hose in accordance with the present invention has flexibility comparable with those of conventional hoses.

With reference to the prior art solutions, as it will be noted CH681911A5, EP1118809A2 and DE202009003394 do not teach a hose for swimming pools to be placed underground and, furthermore, do not have a spiral having rectangular or capital D-shaped cross section with sections equivalent to the above indicated third 4c and fourth 4d section.

So far as in particular the differences with respect to DE202009003394 are concerned, apart from the specific field of use, the main features of a flexible hose with reinforcement spiral are:
  compression strength, internal pressure resistance, depression resistance, resistance to roundness during bending, all features related to the geometry and composition of the reinforcement spiral, and
  flexibility, the capability to be curved, ease of installation, all features related to the geometry and the composition of the flexible or main body.

When designing a hose with a reinforcement spiral, one should evaluate the pressure of the fluid to be transported, the use of the hose during installation (curvature radius, flexibility and therefore ease of use) and then other external forces, such as ground loads, especially in the case of underground installations must be evaluated.

Figure 14:
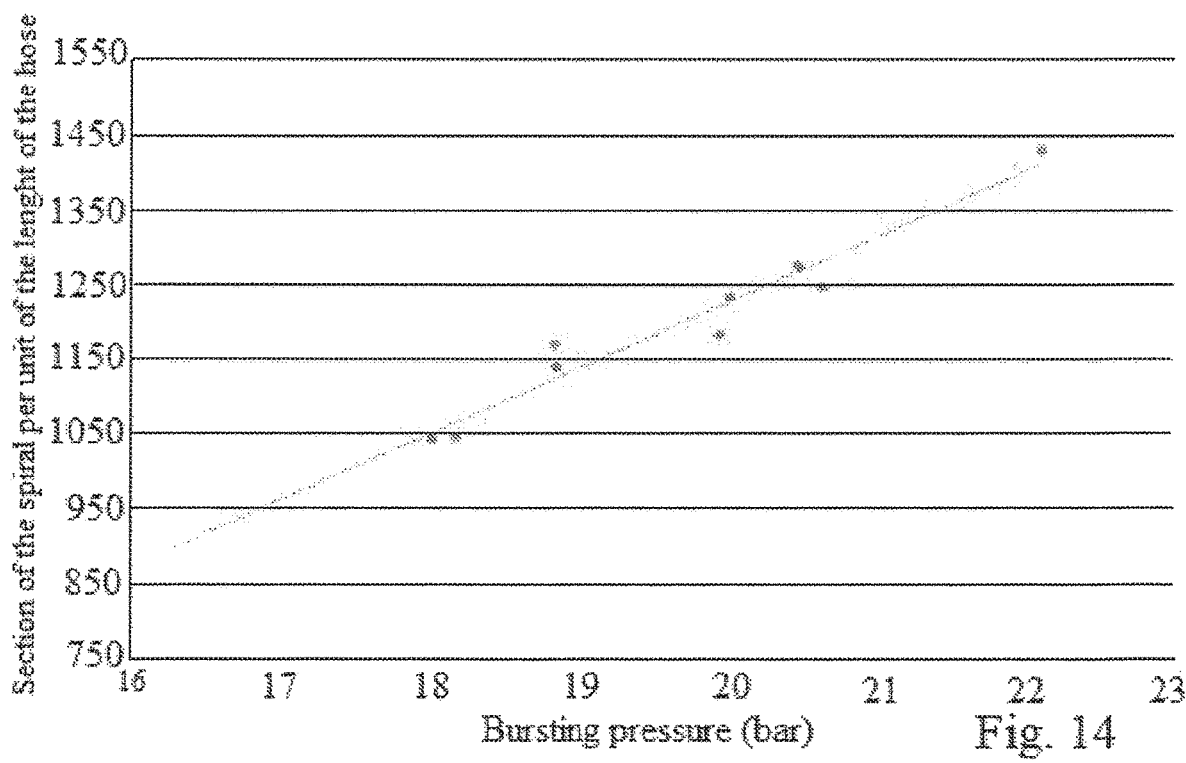
FIGS. 14 to 16 are graphs aimed at clarifying the advantages obtainable by a hose according to the present invention.

On the basis of experimental data, the operating pressure (see FIG. 14) is directly proportional to the section of the reinforcement spiral on hose length unit, so that once the ratio between the reinforcement spiral section and that of the main body has been fixed, to optimize the mechanical characteristics of the hose, it is necessary to design an optimum section of the reinforcement spiral.

From experimental studies it derives that the reinforcement spiral shapes selected in this patent application maximize both the crush resistance and the hose flexibility, compared to conventional circular or similar shapes or even with respect to the hose of DE202009003394.

In this regard, in order to maximize the crush resistance, it is necessary to maximize H given the same section of the spiral, considering that with constant section, as soon as H increases, L decreases.

Figure 15:
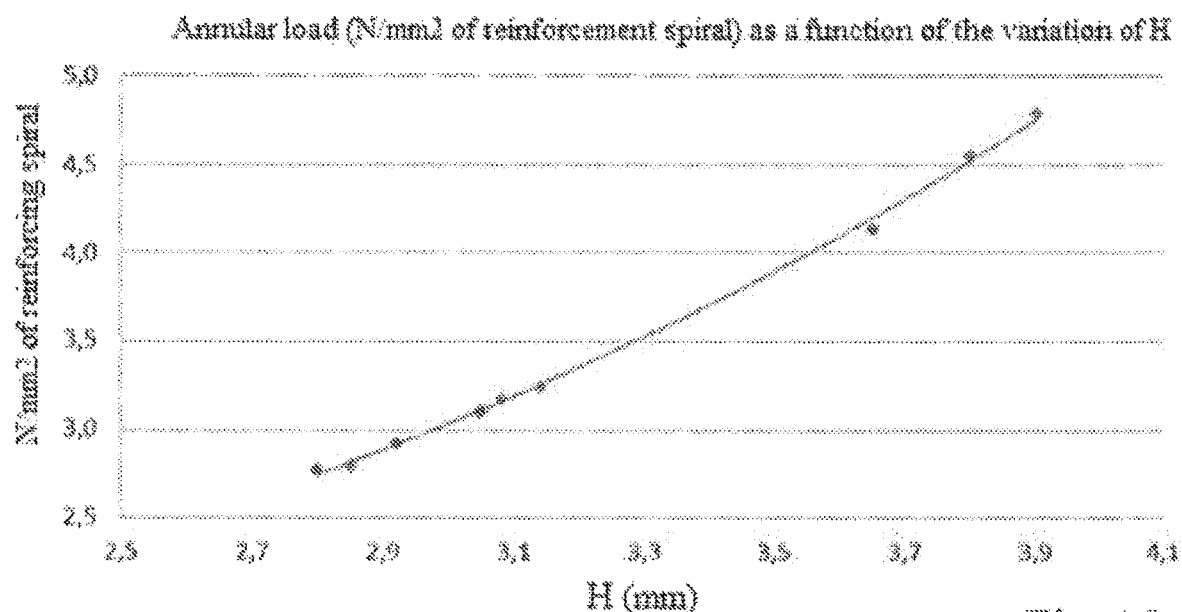

The graph of FIG. 15 shows the load pattern (10% of internal diameter 0 deformation), normalized on reinforcement section unit (N/mm2 of spiral) with respect to the dimension H.

If the section of the reinforcement spiral is curved, especially even at the sides, as described in DE202009003394, the ration between height H and the spiral section is reduced with respect to the case of spiral having section with sides as foreseen according to the present invention and thus the crush resistance is reduced.

The geometry of the spiral also influences the flexibility of the hose, understood as the force needed to impress a certain radius of curvature on the hose.

Thus, for example, given the same section of the reinforcement spiral, with the section of the present invention a distance between two adjacent sections of the reinforcement spiral higher than DE202009003394 is generated. This distance is filled by the main body that undergoes compression during the bending of the hose. The consequence is a lower effort to bending of the hose according to the present invention.

Figure 16:
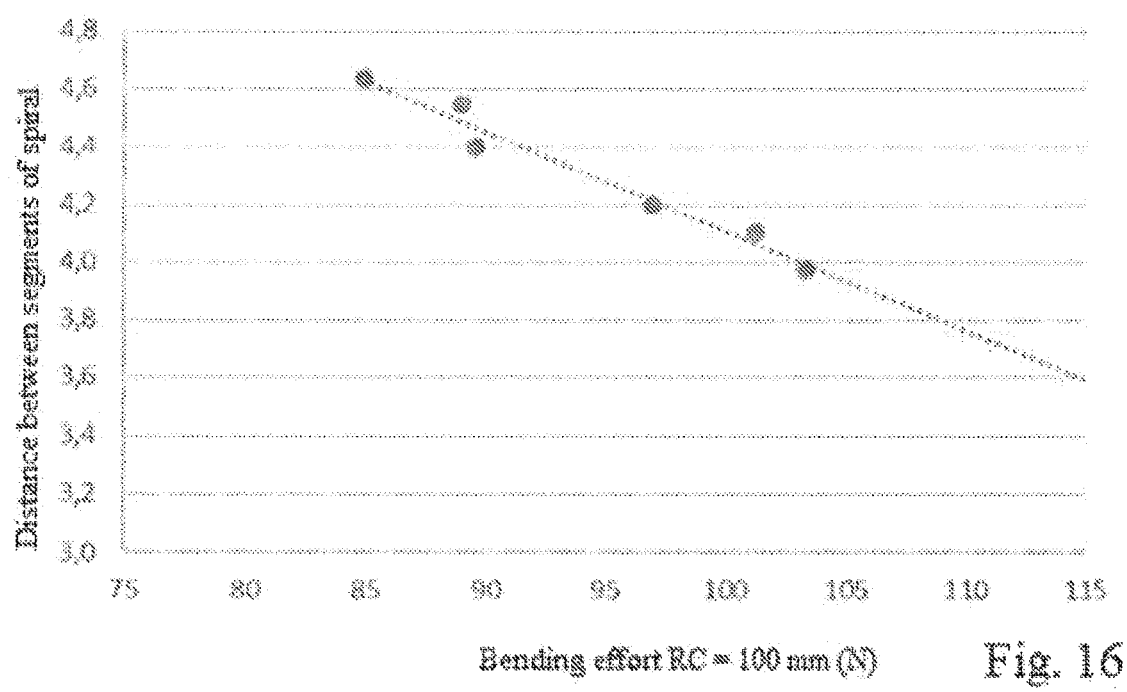

In this regard, from the experimental data (see FIG. 16), a linear relationship exists between the distance among two adjacent sections of the reinforcement spiral and bend or bending effort is shown.

Modifications and variations are possible within the protective scope defined by the claims.

The invention claimed is:

1. A hose for transporting fluids comprising a main body having an inner tubular surface delimiting an axial opening (AL) for the passage of a fluid inside the hose and an outer tubular surface, said main body defining a first and a second mouth or annular end for the inlet/outlet of fluid into/from said axial opening (AL), said main body having a longitudinal axis of symmetry (x-x), said hose further comprising at least one spiral or helical component embedded or formed within said main body and unwinding or extending around said longitudinal axis of symmetry (x-x), said at least one spiral or helical component having a cross section with a first perimeter section proximal to said inner tubular surface and distal from said outer tubular surface and at least one second perimeter section distal from said inner tubular surface and proximal to said outer tubular surface and defining with said first perimeter section the outer perimeter of said cross section, wherein said first perimeter section is substantially straight and parallel or substantially coincident with said inner tubular surface or it is slightly curved with a radius of curvature greater than said second perimeter section, wherein said cross section is capital D-shaped with a third perimeter and a fourth perimeter section arranged one opposite to the other with respect to said first and second section and each designed to bridge connect an end of said first section and an end of said second section, and wherein, said third perimeter and said fourth perimeter sections are substantially parallel and transverse or orthogonal to said longitudinal axis of symmetry (x-x), or said third perimeter and said fourth perimeter section are substantially parallel and inclined with respect to the longitudinal symmetry axis (x-x), or said cross section decreases continuously such that there are no intermediate sections where the section increases and then it decreases again, and/or is constant in the passage from the first section to the second section.

2. The hose according to claim 1, wherein said cross section is taken along a plane (PP) in which said longitudinal axis of symmetry (x-x) lies, that is to say a plane of the sheaf of planes having said longitudinal axis of symmetry (x-x) as line in common.

3. The hose according to claim 1, wherein said at least one second perimeter section comprises a curved section with concavity facing toward said inner tubular surface.

4. The hose according to claim 3, wherein by defining the height (H) of said section, the size of said section from said outer tubular surface to said inner tubular surface, and the width (L) of said section, the size of said section in a direction orthogonal to said height (H), the radius of curvature of said second perimeter section is between ½ L and 6 times L.

5. A hose for transporting fluids comprising a main body having an inner tubular surface delimiting an axial opening (AL) for the passage of a fluid inside the hose and an outer tubular surface, said main body defining a first and a second mouth or annular end for the inlet/outlet of fluid into/from said axial opening (AL), said main body having a longitudinal axis of symmetry (x-x), said hose further comprising at least one spiral or helical component embedded or formed within said main body and unwinding or extending around said longitudinal axis of symmetry (x-x), said at least one spiral or helical component having a cross section with a first perimeter section proximal to said inner tubular surface and distal from said outer tubular surface and at least one second perimeter section distal from said inner tubular surface and proximal to said outer tubular surface and defining with said first perimeter section the outer perimeter of said cross section, wherein said first perimeter section is substantially straight and parallel or substantially coincident with said inner tubular surface or it is slightly curved with a radius of curvature greater than said second perimeter section, wherein said cross section is capital D-shaped with a third perimeter and a fourth perimeter section arranged one opposite to the other with respect to said first and second section and each designed to bridge connect an end of said first section and an end of said second section, and wherein by defining the height (H) of said section, the size of said section from said outer tubular surface to said inner tubular surface and width (L) of said section, the size of said section in an orthogonal direction to said height (H), said section has a width (L) that is less than or equal to the height (H).

6. The hose according to claim 5, wherein said height (H) ranges between 1 mm and 25 mm, whereas said width (L) ranges between 1 mm and 25 mm.

7. The hose according to claim 6, wherein said height (H) ranges between 1 mm and 15 mm, whereas said width (L) ranges between 1 mm and 15 mm.

8. The hose according to claim 1, wherein the thickness of said main body is equal to or slightly greater than the height (H) of said section, that is to say, the size of said section from said outer tubular surface to said inner tubular surface or the thickness of intermediate sections of said main body between one turn and the other of said spiral or helical component is less than said height (H) and the thickness of said main body is equal to or slightly greater than the height (H) of said section only at the respective sections delimiting the housing zone of the turns of said spiral or helical component.

9. The hose according to claim 1, wherein said first perimeter section defines and extends by a value corresponding to the width L of said section.

10. The hose according to claim 1, wherein said first and/or said second perimeter section are flush with or very close to said inner tubular surface and/or said outer tubular surface, respectively, that is to say that there are no portions of said main body between said first perimeter section and said inner tubular surface and/or there are no portions of said main body between said second perimeter section and said outer tubular surface.

11. The hose according to claim 1, wherein said at least one spiral or helical component extends from said first to said second annular mouth or end.

12. The hose according to claim 1, wherein said first perimeter section corresponds to a base side of the D-shaped cross section, and the second perimeter section corresponds to a curved or domed part of the D-shaped cross section projecting from the base side.

13. The hose according to claim 5, wherein said first perimeter section corresponds to a base side of the D-shaped cross section, and the second perimeter section corresponds to a curved or domed part of the D-shaped cross section projecting from the base side.

\* \* \* \* \*